Patented Apr. 24, 1951

2,549,880

UNITED STATES PATENT OFFICE 2,549,880

METHODS FOR TREATING MICA AND COMPOSITION

Jacques Jules Bardet, Paris, France, assignor, by mesne assignments, to Prosilis, Paris, France, a corporation of France No Drawing. Application July 16, 1945, Serial No. 605,451. In France October 20, 1943

Section 1, Public Law 690, August 8, 1946
Patent expires October 20, 1963

7 Claims. (Cl. 154—2.6)

The present invention relates to the treatment of mica and, generally, other micaceous and cleavable rocks, for division thereof into flakes of a thickness which may be as low as some thousandths of a millimeter and of an area as high as one square centimeter or even more.

The flakes thus obtained may be treated, through methods analogous to those employed for the treatment of cellulosic fibres, with or without the addition of supplementary bodies, for the manufacture of large size sheets, analogous to paper or cardboard sheets, or for the obtainment of moulded articles, these sheets and articles being advantageously utilized as dielectric elements, or for other suitable purposes. After their manufacture, they may be impregnated or coated with organic or mineral binding substances, acting either in the cold or in the hot state, with varnishes or the like, in particular with a view to increasing cohesion of the finished product and to render it water resisting.

According to an essential feature of the present invention, mica or another analogous starting material is heated to a temperature sufficient for producing cleavage thereof but lower than the critical temperature corresponding to total dehydration of said material, after which the latter is subjected, successively to the action of two solutions capable of reacting upon each other so as to produce a disengagement of gas.

This gaseous disengagement starts the splitting of the material into flakes, which splitting is finished by a vigorous stirring of the material in the treatment solution. The flakes thus obtained are then washed. Through levigation, it is possible to classify them by size. These flakes, after they have been collected on a filter and dried, can be kept for subsequent utilization. They can easily be again placed in suspension in water. The cakes formed by these flakes, after drying, are sufficiently rigid and can advantageously be used as heat insulating elements. This property results from the fact that their thermal conductivity is very low, owing to their state of fine division and to their low density, and also to their high reflecting power for radiations. They can be used up to temperatures of about 800° C.

The aqueous suspension of flakes, either alone or with the addition of suitable bodies, is well adapted for use as a starting material for the manufacture of sheets, blades, plates or analogous elements of relatively large area, or for the production of moulded articles. Lubricants analogous to plumbago are obtained either directly with the pulp placed in suspension in a suitable medium, such as water, oil, or the like, or, in the same conditions of suspension, with classified flakes obtained through levigation of the initial pulp, or with powders resulting from the crushing thereof.

Starting from the pulp in suspension in water, the manufacture of articles exactly similar to paper and cardboard can be carried out through the same methods as employed for the manufacture of ordinary paper, either made by hand or by means of a machine.

The obtainment of moulded articles made from this pulp is carried out by compression in a mould, with or without the addition of adjuvant substances. If such substances are utilized, the treatment for obtainment of the finished article is conducted at a temperature sufficient for softening or polymerizing the substance or substances in question.

The adjuvant substances to be incorporated into the pulp for the production of paper, cardboard, moulded articles, or the like, may consist either of fusible or polymerizable organic substances, or of fusible precipitates of mineral salts. For instance, lead borates may be used with advantage. These salts are caused to precipitate on the flakes that form the pulp, after which this pulp is transformed into paper, cardboard, moulded articles, or the like, with a suitable compressing and at a temperature sufficiently high for softening the lead borate present on the flakes. Care should be taken to make use, as components for the obtainment of the precipitate, of bodies which leave in the mother waters only volatile or decomposable salts which, on subsequent heating and compression, leave, in the final product, no decomposition residue as might have a noxious effect on the electrical properties thereof.

For instance, lead acetate may be dissolved in the aqueous pulp, to which boric acid and ammonia are subsequently added. In this way, a colloidal lead borate is obtained, which is retained by the flakes and remains evenly distributed over the surface thereof, during the subsequent filtering operation and the formation of the finished product.

It is also possible to operate in the reverse order, that is to say, to start from an aqueous pulp containing boric acid in solution therein and then to add ammonia and lead acetate. In both cases, there is formed, simultaneously with the desired precipitate of lead borate, a certain amount of ammonium acetate which remains in solution. Upon heating, lead acetate melts and contributes in binding the mica flakes together, while the amount of ammonium acetate that may have subsisted is decomposed into volatile products.

I might also, within the scope of the invention, make use for the same purpose of other salts, such as nitrates, which also give products that are decomposed by heat. On the other hand, boric acid might be replaced by any acid, or mixture of acids, capable of giving, with lead or other metals, fusible glasses. Such are, for instance, hydrochloric acid, phosphoric acid, silicic acid, vanadic acid, molybdic acid, and others.

In the preceding description, the word "mica" has been particularly used for designating the starting material to be divided into flakes. This word should be taken in the broadest possible meaning thereof, that is to say, including cleavable rocks other than mica properly so-called. The method according to the present invention applies to all micaceous rocks, including the elements, sometimes of very fine texture, that can be extracted from kaolin and certain clays.

Here is an example of the method according to the invention:

Muscovite mica, in the form of waste or laminae, is heated up to a temperature of about 800° C., for instance in a muffle furnace. It is then thrown, as quickly as possible (so as to avoid a substantial cooling thereof) into a saturated solution of sodium carbonate or bicarbonate. After cooling, the mica is removed from this solution. It is roughly drained, then dropped into a five per cent solution of hydrochloric acid. The latter is caused to act for about one hour. Then the suspension of mica in this solution is vigorously stirred, for instance by means of a helical stirring device, for about half an hour. The flakes are then washed by decantation.

Of course, this specific method may be modified while remaining within the scope of the invention. For instance, the order of treatment in the above example might be reversed, i. e. the hot mica might be first immersed in the hydrochloric acid solution, and then subjected to the action of the solution of sodium carbonate or bicarbonate. However, it seems that the sheets, plates or other articles obtained from mica treated in the last mentioned manner have not as good a cohesion as those obtained from mica treated according to the first described example.

In a general manner, while I have, in the above description, disclosed what I deem to be practical and efficient embodiments of the present invention, it should be well understood that I do not wish to be limited thereto as there might be changes made therein without departing from the principle of the invention as comprehended within the scope of the appended claims.

What I claim is:

1. A method for the conversion of mica, initially in the form of blocks, sheets or the like, into a pulp suitable for conversion into sheet form by conventional paper making methods and for conversion into molded form by the action of heat and pressure, which comprises heating the mica to about 800° C., immersing the hot mica into a first solution, draining off excess solution, and then immersing the mica into a second solution which reacts with the first solution with evolution of gas, and maintaining such immersion until cleavage of the mica into flake form is accomplished, and then disintegrating the resultant flakes by simple agitation thereof in the said second solution until a mica pulp is formed, one of the said solutions being a concentrated solution of a soluble carbonate and the other a solution of a strong acid.

2. A process according to claim 1, wherein the first solution is a concentrated solution of a soluble carbonate and the second solution is a strong acid solution.

3. A process according to claim 1, wherein the first solution is a strong acid solution and the second solution is a concentrated solution of a soluble carbonate.

4. A process according to claim 1, wherein the obtained mica pulp is washed and then solutions of a soluble lead salt, boric acid and ammonia are incorporated into the pulp whereby lead borate is formed in situ therein.

5. A process according to claim 1, wherein the obtained mica pulp is washed, and an adjuvant material is incorporated thereinto.

6. A process for producing micaceous articles comprising the steps of first partially dehydrating natural mica by heating the same to about 800° C., then sub-dividing the heat-treated mica into thin finely divided flakes, agitating the mica flakes in a liquid medium to produce a pulp, and forming an article from said pulp.

7. A composition of matter consisting essentially of mica partially dehydrated by heat treatment at about 800° C., substantially all of said heat-treated mica being reduced to the form of a substantially dry pulp of finely divided individual thin mica flakes having the characteristics of entering easily into suspension in an aqueous medium and on removal of said aqueous medium of forming a coherent mass.

JACQUES JULES BARDET.

REFERENCES CITED

The following references are of record in the file of this patent:

UNITED STATES PATENTS

| Number | Name | Date |
|---|---|---|
| 686,929 | Heard | Nov. 19, 1901 |
| 847,910 | Cooper | Mar. 19, 1907 |
| 1,320,509 | Swett | Nov. 4, 1919 |
| 1,870,835 | Coffey et al. | Aug. 9, 1932 |
| 2,108,577 | Brough | Feb. 15, 1938 |

FOREIGN PATENTS

| Number | Country | Date |
|---|---|---|
| 96,336 | Austria | Mar. 10, 1924 |
| 553,104 | Great Britain | May 7, 1943 |
| 72,209 | Norway | June 23, 1947 |